US012229592B2

(12) United States Patent
Youn et al.

(10) Patent No.: US 12,229,592 B2
(45) Date of Patent: Feb. 18, 2025

(54) METHOD OF EXECUTING TASK AND SCHEDULING LAYER TASKS USING NEURAL NETWORK AND ELECTRONIC DEVICE USING THE SAME

(71) Applicant: SAMSUNG ELECTRONICS CO., LTD., Suwon-si (KR)

(72) Inventors: Chan-Hyun Youn, Daejeon (KR); Seong-Hwan Kim, Daejeon (KR); Gyusang Cho, Daejeon (KR)

(73) Assignees: SAMSUNG ELECTRONICS CO., LTD., Suwon-si (KR); KOREA ADVANCED INSTITUTE OF SCIENCE AND TI, Daejeon (KR)

( * ) Notice: Subject to any disclaimer, the term of this patent is extended or adjusted under 35 U.S.C. 154(b) by 628 days.

(21) Appl. No.: 17/477,760

(22) Filed: Sep. 17, 2021

(65) Prior Publication Data

US 2022/0107837 A1 Apr. 7, 2022

(30) Foreign Application Priority Data

Oct. 6, 2020 (KR) .......................... 10-2020-0128952

(51) Int. Cl.
*G06F 9/48* (2006.01)
*G06F 9/50* (2006.01)
*G06N 3/045* (2023.01)

(52) U.S. Cl.
CPC .......... *G06F 9/4881* (2013.01); *G06F 9/4856* (2013.01); *G06F 9/5038* (2013.01); *G06F 9/5066* (2013.01); *G06N 3/045* (2023.01)

(58) Field of Classification Search
None
See application file for complete search history.

(56) References Cited

U.S. PATENT DOCUMENTS 8,863,128 B2 10/2014 Iorio
10,068,136 B2 9/2018 Heier et al.
(Continued)

FOREIGN PATENT DOCUMENTS

CN 109165087 A 1/2019
CN 109325494 A 2/2019
(Continued)

OTHER PUBLICATIONS

H. Lin et al., "Fully Convolutional Network with Task Partitioning for Inshore Ship Detection in Optical Remote Sensing Images", IEEE Geoscience and Remoted Sensing Letters (vol. 14, Issue 10) 2017.

(Continued)

*Primary Examiner* — Eric C Wai
(74) *Attorney, Agent, or Firm* — Muir Patent Law, PLLC

(57) ABSTRACT

A task execution method using resources includes receiving an execution request for a first task; analyzing the first task and dividing the first task into a plurality of sub-tasks; identifying a sub-task using a first neural network from among the sub-tasks and dividing the identified sub-task into a plurality of layer tasks corresponding to calculations between layers constituting the first neural network; calculating a deadline time of each of the sub-tasks; scheduling a first sub-task to be scheduled to a first resource group from among the resources; and, when a runtime of the first sub-task exceeds a deadline time of the first sub-task, scheduling a sub-task or a layer task subsequent to the first sub-task to a second resource group.

20 Claims, 15 Drawing Sheets

(56) References Cited

U.S. PATENT DOCUMENTS

| | | | |
|---|---|---|---|
| 2017/0249574 A1* | 8/2017 | Knijnik | G06Q 10/06313 |
| 2019/0065932 A1* | 2/2019 | Shen | G06N 3/045 |
| 2020/0117519 A1 | 4/2020 | Chen et al. | |
| 2020/0401829 A1 | 12/2020 | Xin | |
| 2022/0173973 A1* | 6/2022 | Towles | H04L 41/12 |

FOREIGN PATENT DOCUMENTS

| | | |
|---|---|---|
| CN | 110378916 A | 10/2019 |
| CN | 110796245 | 2/2020 |
| KR | 10-2082411 B1 | 2/2020 |

OTHER PUBLICATIONS

H. Kim et al., "Performance Analysis of CNN frameworks for GPUs", 2017.

Hybrid Resource Scheduling Scheme for Video Surveillance in GPU-FPGA Accelerated Edge Computing System.

* cited by examiner

FIG. 5B $$D = ERT1 + ERT2 + ERT5 + ERT6 \text{ (RESOURCE1)}$$

| ST1<br>(DT1) | ST2<br>(DT2) | | ST5<br>(DT5) | ST6<br>(DT6) |

ST3 $\left(DT3 = DT2 \cdot \dfrac{ERT3}{ERT3+ERT4}\right)$ | ST4 $\left(DT4 = DT2 \cdot \dfrac{ERT4}{ERT3+ERT4}\right)$

FIG. 5C

D = ERT1+ERT3+ERT4+ERT5+ERT6 (RESOURCE1)

| ST1 (DT1) | ST3 (DT3) | ST4 (DT4) | ST5 (DT5) | ST6 (DT6) |

ST2 (DT2=DT3+DT4)

METHOD OF EXECUTING TASK AND SCHEDULING LAYER TASKS USING NEURAL NETWORK AND ELECTRONIC DEVICE USING THE SAME

CROSS-REFERENCE TO RELATED APPLICATION

Korean Patent Application No. 10-2020-0128952, filed on Oct. 6, 2020, in the Korean Intellectual Property Office, and entitled: "Task Execution Method and Electronic Device Using the Same," is incorporated by reference herein in its entirety.

BACKGROUND

1. Field

Embodiments relate to a task execution method and an electronic device including the same.

2. Description of the Related Art

In a computing system including various resources, computing performance may depend on the characteristics of the resources. Therefore, when an appropriate job scheduling for resources is not applied, runtimes of tasks may be delayed, and thus, quality of service may be deteriorated.

SUMMARY

Embodiments are directed to a task execution method using resources, the task execution method including: receiving an execution request for a first task; analyzing the first task and dividing the first task into a plurality of sub-tasks; identifying a sub-task using a first neural network from among the plurality of sub-tasks and dividing the identified sub-task into a plurality of layer tasks corresponding to calculations between layers constituting the first neural network; calculating a deadline time of each of the plurality of sub-tasks; scheduling a first sub-task to be scheduled to a first resource group from among the resources; and when a runtime of the first sub-task exceeds a deadline time of the first sub-task, scheduling a sub-task or a layer task subsequent to the first sub-task to a second resource group.

Embodiments are also directed to a task execution method using resources, the task execution method including: receiving an execution request for a first task; analyzing the first task and dividing the first task into a plurality of sub-tasks; identifying a sub-task using a first neural network from among the plurality of sub-tasks, and dividing the identified sub-task into a plurality of layer tasks corresponding to calculations between layers constituting the first neural network; identifying resources corresponding to a sub-task or a layer task to be scheduled from among the resources; and scheduling the sub-task or the layer task to be scheduled to one of the identified resources.

Embodiments are also directed to an electronic device, including: a plurality of resources including at least one field-programmable gate array (FPGA) and at least one graphics processing unit (GPU); and a processor configured to, when a request to execute a first task is received, analyze the first task, divide the first task into a plurality of sub-tasks, and schedule the plurality of sub-tasks to the at least one GPU. The processor may be further configured to identify a sub-task using a first neural network from among the plurality of sub-tasks, and divide the identified sub-task into a plurality of layer tasks corresponding to calculations between layers constituting the first neural network. When a runtime of a first sub-task from among the plurality of sub-tasks exceeds a deadline time of the first sub-task, the processor may schedule a first layer task subsequent to the first sub-task to the at least one GPU or the at least one FPGA.

BRIEF DESCRIPTION OF THE DRAWINGS

Features will become apparent to those of skill in the art by describing in detail example embodiments with reference to the attached drawings in which:

FIG. 5B is a diagram showing deadline times of sub-tasks calculated based on a first path of a workflow according to an example embodiment;

FIG. 5C is a diagram showing deadline times of sub-tasks calculated based on a second path of a workflow according to an example embodiment;

DETAILED DESCRIPTION

Figure 1:
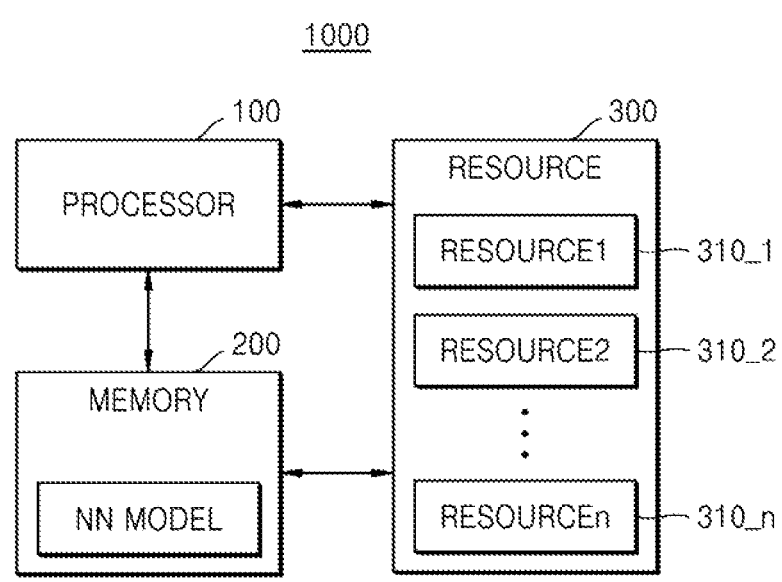
FIG. 1 is a diagram showing an electronic device according to an example embodiment.

FIG. 1 is a diagram showing an electronic device according to an example embodiment.

Referring to FIG. 1, an electronic device 1000 may include a processor 100, a memory 200, and a resource 300. In an example embodiment, the resource 300 may include n (n is a positive integer) resources 310_1, 310_2, . . . 310_n. The resource 300 may include various processing devices like a central processing unit (CPU), a graphics processing unit (GPU), an application processor (AP), a digital signal processor (DSP), a field-programmable gate array (FPGA), a neural network processing unit (NPU), an electronic control unit (ECU), and an image signal processor (ISP). The resources 310_1, 310_2, . . . 310_n may be the same or different types of calculation processing devices. Hereinafter, it is assumed that the resources 310_1, 310_2, . . . 310_n include at least one GPU and at least one FPGA.

The electronic device 1000 may perform a function of extracting effective information by analyzing input data through an artificial neural network (ANN). The electronic device 1000 may be an AP employed in a mobile device. In another implementation, the electronic device 1000 may correspond to a computing system, a robot device like a drone or an advanced drivers assistance system (ADAS), a smart TV, a smartphone, a medical device, a mobile device, an image display device, a measurement device, an Internet of Things (IoT) device, and various other devices.

An ANN may refer to a computing system simulating a biological neural network that constitutes the brain of an animal. Unlike classical algorithms that perform tasks according to predefined conditions like rule-based programming, an ANN may learn to perform tasks by considering a plurality of samples (or examples). The ANN may have a structure in which artificial neurons (or neurons) are connected to one another, and connections between neurons may be referred to as synapses. A neuron may process a received signal, and transmit a processed signal to other neurons through synapses. An output of a neuron may be referred to as "activation". A neuron and/or a synapse may have a variable weight, and the influence of a signal processed by a neuron may increase or decrease according to a weight. In particular, a weight related to an individual neuron may be referred to as a bias.

An ANN may include, but is not limited to, various types of neural networks like a convolution neural network (CNN) like GoogLeNet, AlexNet, ResNet, and VGG Network, a stacking-based deep neural network (S-DNN), a state-space dynamic neural network (S-SDNN), a deconvolution network, a deep belief network (DBN), a restricted Boltzmann Machine (RBM), a fully convolutional network, a long short-term memory (LSTM) network, a generative adversarial network (GAN), an inception V3 (IV3) network, a classification network, etc. Also, a neural network executing one task may include sub-neural networks, and the sub-neural networks may be implemented by homogeneous or heterogeneous neural networks.

The processor 100 controls all operations of the electronic device 1000. The processor 100 may include a single core or multi-cores. The processor 100 may process or execute programs and/or data stored in the memory 200. In an example embodiment, the processor 100 may control functions of the electronic device 1000 by executing programs stored in the memory 200.

The memory 200 may include at least one of a volatile memory and a non-volatile memory. The non-volatile memory includes read only memory (ROM), programmable ROM (PROM), electrically programmable ROM (ERPOM), electrically erasable and programmable ROM (EEPROM), flash memory, phase-change random access memory (PRAM), magnetic RAM (MRAM), resistive RAM (RRAM), ferroelectric RAM (FeRAM), etc. The volatile memory includes dynamic RAM (DRAM), static RAM (SRAM), synchronous DRAM (SDRAM), PRAM, MRAM, RRAM, FeRAM, etc. According to example embodiments, the memory 200 may include at least one of a hard disk drive (HDD), a solid state drive (SSD), a compact flash (CF) storage, a secure digital (SD) storage, a micro secure digital (Micro-SD) storage, a mini Secure digital (Mini-SD) storage, an extreme digital (xD) storage, and a memory stick.

When a task execution request is received from the outside, the processor 100 according to the present example embodiment may analyze a requested task, divide the requested task into a plurality of sub-tasks, and schedule the sub-tasks to the resources 310_1, 310_2, . . . 310_n. The resources 310_1, 310_2, . . . 310_n may perform allocated sub-tasks.

In an example embodiment, the processor 100 may divide a requested task into a plurality of tasks of a smaller unit. For example, the processor 100 may divide a requested task (hereinafter, referred to as a 'first task') into a plurality of sub-tasks according to various criteria like the type and size of input and output data, the type of operation, and the type of neural network used for task processing.

The processor 100 may identify whether there is a sub-task using a neural network of a particular type from among the sub-tasks. When the processor 100 identifies a sub-task using a neural network of a particular type, the processor 100 may divide the corresponding sub-task into smaller tasks. Here, the neural network of a particular type refers to, for example, a CNN model. However, example embodiments are not limited thereto, and the neural network of a particular type may include neural networks of other types like a Recurrent Neural Network (RNN) model. The processor 100 may classify sub-tasks, using the neural network of the particular type, into a plurality of tasks corresponding to calculations between a plurality of layers constituting the neural network (hereinafter, referred to as layer tasks). A detailed description of a neural network consisting of a plurality of layers will be given below with reference to FIG. 2.

The processor 100 may allocate the classified sub-tasks to the resources 310_1, 310_2, . . . 310_n. The processor 100 may allocate a next sub-task after one sub-task is allocated and completed, instead of allocating all of the classified sub-tasks at a certain time point. For example, the processor 100 may allocate a second sub-task next to a first sub-task after the first sub-task is allocated and executed. Hereinafter, for convenience of explanation, a sub-task to be scheduled by the processor 100 will be referred to as a target task.

In an example embodiment, the processor 100 may divide the resources 310_1, 310_2, . . . 310_n into a first resource group and a second resource group, and allocate a target task to a resource, which is expected to execute the target task fastest, from the first resource group. The first resource group and the second resource group may be distinguished from one another according to types of resources. For example, the first resource group may include GPUs, and the second resource group may include FPGAs. An FPGA is capable of processing a task using a CNN model from among neural networks faster than a GPU, whereas a GPU is capable of processing tasks that do not use a neural network faster than an FPGA. Because the number of sub-tasks that do not use a CNN model from among sub-tasks constituting a particular task may be greater than the number of sub-tasks using the CNN model, the processor 100 may first allocate a target task to the first resource group, which includes GPUs. At this time, the processor 100 may allocate the target task to a resource capable of processing the target task fastest from among resources belonging to the first resource group.

When an exceptional situation occurs during the execution of the target task, the processor 100 may allocate at least one of subsequent sub-tasks and layer tasks to one of resources of the second resource group. Here, the exceptional situation refers to a situation in which the runtime of the target task is longer than expected or a temporary error occurs, and may indicate that the execution of an entire task (i.e., the first task) may be delayed more than planned. A subsequent task allocated to one of resources of the second resource group is a task that may be processed faster by an FPGA than by a GPU, e.g., a sub-task or a layer task using a CNN model.

Thus, the processor 100 may first allocate the target task only to GPUs from among the resources 310_1, 310_2, ... 310_n, and, when the execution of the target task allocated to GPUs is delayed, the processor 100 may allocate at least one of sub-tasks and layer tasks subsequent to the target task to an FPGA, thereby preventing execution of the first task from being delayed.

The processor 100 may calculate a deadline time of each sub-task to identify an execution delay of the target task. The processor 100 may measure a runtime, which is the time for processing an allocated task. When the runtime of the target task exceeds the deadline time, the processor 100 may determine that a delay has occurred during the execution of the target task. Detailed descriptions of an operation for calculating a deadline time will be given below with reference to FIGS. 5A to 5C.

Although FIG. 1 shows that the electronic device 1000 includes the resource 300, example embodiments are not limited thereto. For example, the resource 300 may be a component separate from the electronic device 1000, and the electronic device 1000 may be implemented to perform a task through communication with the resource 300.

As described above, the electronic device 1000 according to the present example embodiment divides a requested task into a plurality of sub-tasks, and allocates the divided sub-tasks to resources of a first type. Here, when a delay occurs, the electronic device 1000 identifies a subsequent sub-task or a subsequent layer task that may be processed faster by a resource of a second type, and allocates an identified task to a resource of the second type, thereby reducing the total execution time.

Figure 2:
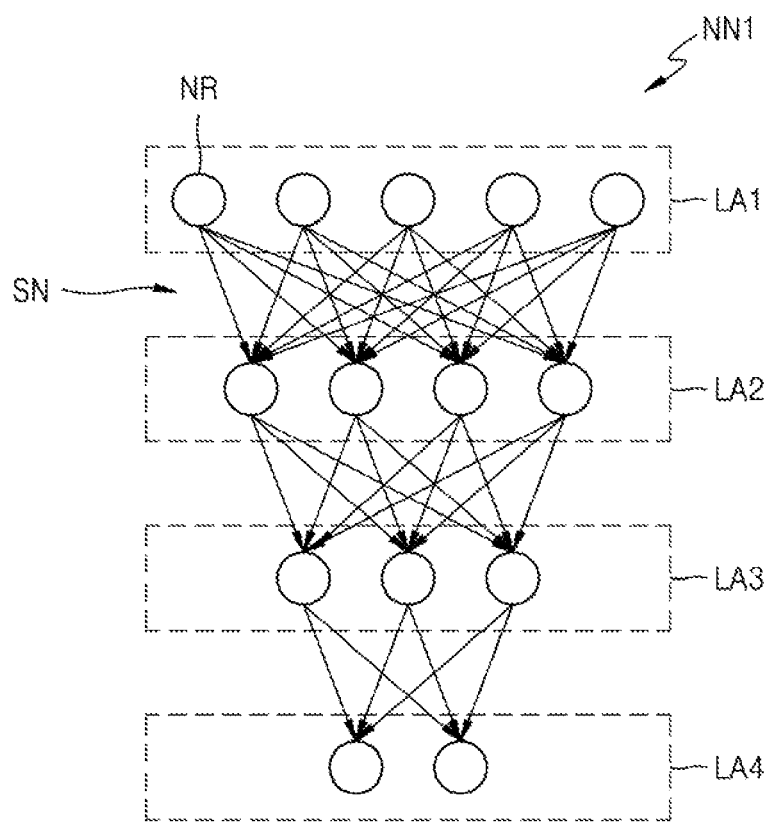
FIG. 2 is a diagram showing a configuration of a neural network according to an example embodiment.

FIG. 2 is a diagram showing a configuration of a neural network according to an example embodiment.

Referring to FIG. 2, a first neural network NN1 may include a plurality of layers L1 to L4, and the layers L1 to L4 may each include at least one neuron NR. An output of each layer may be input to a subsequent layer through a synapse SN. For example, a first layer L1 may process input data for the first neural network NN1 and provide an output to a second layer L2 through the synapse SN, and the second layer L2 may provide an output to a third layer L3 through the synapse SN. Finally, a fourth layer L4 may output output data of the first neural network NN1.

Although FIG. 2 shows that the first neural network NN1 includes 4 layers, example embodiments are not limited thereto, and the neural network may include, e.g., 3 layers or less or 5 layers or more.

When the processor 100 of FIG. 1 identifies a sub-task using the first neural network NN1, the processor 100 may divide the sub-task into 3 layer tasks respectively corresponding to calculations between the layers L1 to L4. For example, the processor 100 may divide the sub-task using the first neural network NN1 into a first layer task corresponding to a calculation between the first layer L1 and the second layer L2, a second layer task corresponding to a calculation between the second layer L2 and the third layer L3, and a third layer task corresponding to a calculation between the third layer L3 and the fourth layer L4.

Figure 3:
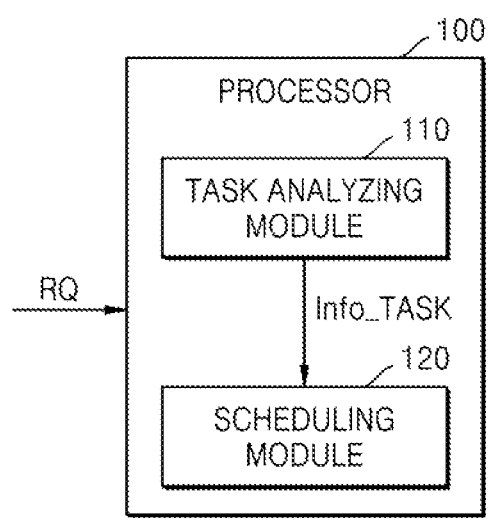
FIG. 3 is a diagram showing a detailed configuration of a processor according to an example embodiment.

FIG. 3 is a block diagram showing a detailed configuration of a processor according to an example embodiment.

Referring to FIG. 3, the processor 100 may include a task analyzing module 110 and a scheduling module 120.

In an example embodiment, the task analyzing module 110 may receive a request RQ for performing a task, and may divide a requested task into a plurality of sub-tasks and a plurality of layer tasks. The task analyzing module 110 may calculate deadline times of the sub-tasks and the layer tasks. The task analyzing module 110 may provide task information Info_TASK, which includes information regarding divided tasks and calculated deadline times, to the scheduling module 120. The task analyzing module 110 may store the task information Info_TASK in the memory 200.

The scheduling module 120 may receive the task information Info_TASK from the task analyzing module 110, and sequentially schedule the sub-tasks to first resources from among the resources 310_1, 310_2, ... 310_n based on the received task information Info_TASK. When the scheduling module 120 identifies a delay of a scheduled sub-task based on the task information Info_TASK, the scheduling module 120 may schedule a subsequent sub-task or layer task to at least one second resource.

The task analyzing module 110 and the scheduling module 120 may each be implemented by a logic block implemented through logic synthesis, a software block to be performed by a processor, or a combination thereof. In an example embodiment, the task analyzing module 110 and the scheduling module 120 may each be a procedure, e.g., as a set of a plurality of instructions to be executed by the processor 100 and may be stored in the memory 200.

Figure 4A:
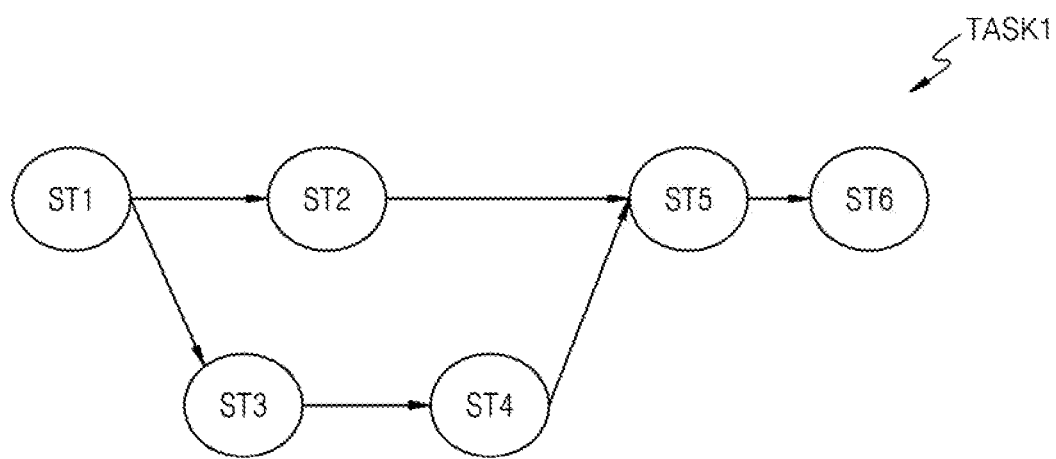
FIG. 4A is a diagram showing a task expressed as a workflow, according to an example embodiment.
Figure 4B:
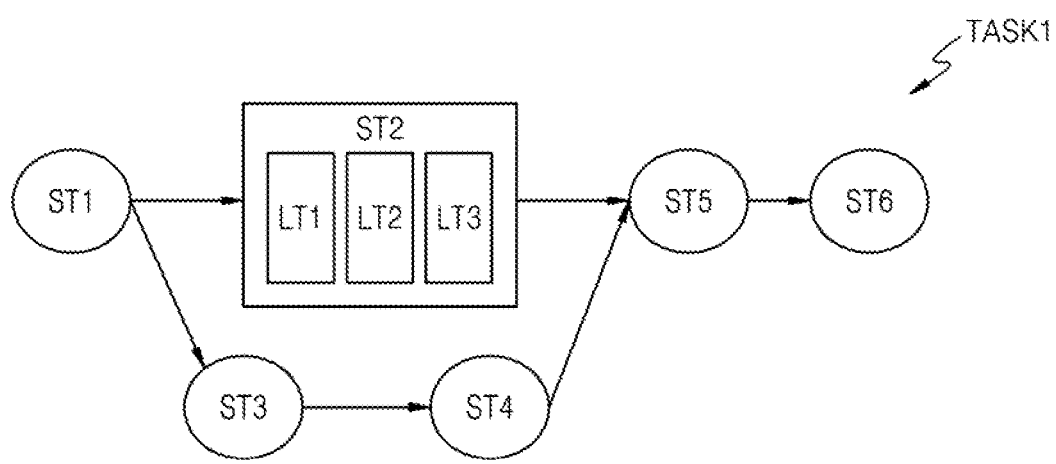
FIG. 4B is a diagram showing a task expressed as a workflow, according to another example embodiment.

FIG. 4A is a diagram showing a task expressed as a workflow, according to an example embodiment. FIG. 4B is a diagram showing a task expressed as a workflow, according to another example embodiment. Hereinafter, with reference to FIGS. 4A and 4B, a detailed operation of the task analyzing module 110 for dividing a first task TASK1 into sub-tasks will be described.

When the task analyzing module 110 receives an execution request for the first task TASK1 from the outside, the task analyzing module 110 may analyze the first task TASK1. The task analyzing module 110 may generate a plurality of sub-tasks and a workflow to which an execution order of the sub-tasks is reflected. For example, the workflow may be implemented in the form of a directed acyclic graph (DAG). However, example embodiments are not limited thereto, and the task analyzing module 110 may implement a workflow in a form other than the DAG.

Referring to FIG. 4A, the first task TASK1 expressed as a workflow includes nodes representing six sub-tasks ST1 to ST6. For example, when the first task TASK1 is a video stream processing operation, the first task TASK1 includes nodes representing a first sub-task ST1, which is an object recognition task, a second sub-task ST2, which is a CNN feature extraction task, a third sub-task ST3, which is a scale invariant feature transform (SIFT) feature extraction task, a fourth sub-task ST4, which is a vector of locally aggregated descriptors (VLAD) pooling task, a fifth sub-task, which is a feature synthesis task, and a sixth sub-task ST6, which is an object re-recognition task.

Referring to FIG. 4A, the workflow of the first task TASK1 starts at the first sub-task ST1, which is a first node, and is completed at the sixth sub-task ST6, which is the last node.

In the workflow of the first task TASK1, the first node is connected to a node representing the second sub-task ST2 and a node representing the third sub-task ST3. Thus, when the first sub-task ST1 is completed, the second sub-task ST2 may be performed in parallel with the third sub-task ST3.

In the workflow of the first task TASK1, a fifth node is connected to the node representing the second sub-task ST2 and a node representing the fourth sub-task ST4. Thus, when the second sub-task ST2 and the fourth sub-task ST4 are completed, the fifth sub-task ST5 may be performed.

The task analyzing module 110 according to the present example embodiment may additionally identify whether there is a sub-task using a neural network of a particular type (e.g., a CNN model) from among the first to sixth sub-tasks ST1 to ST6 constituting the workflow. When the task analyzing module 110 identifies a sub-task using a neural network of the particular type, the task analyzing module 110 may divide the corresponding sub-task into layer tasks corresponding to calculations between layers constituting the neural network.

For example, referring to FIG. 4B, when the task analyzing module 110 identifies the second sub-task ST2 using a neural network of the particular type (i.e., a CNN model), the task analyzing module 110 may divide the second sub-task ST2 into a plurality of layer tasks LT1 to LT3. The layer tasks LT1 to LT3 may be respectively processed by the resources 310_1, 310_2, . . . 310_n.

Figure 5A:
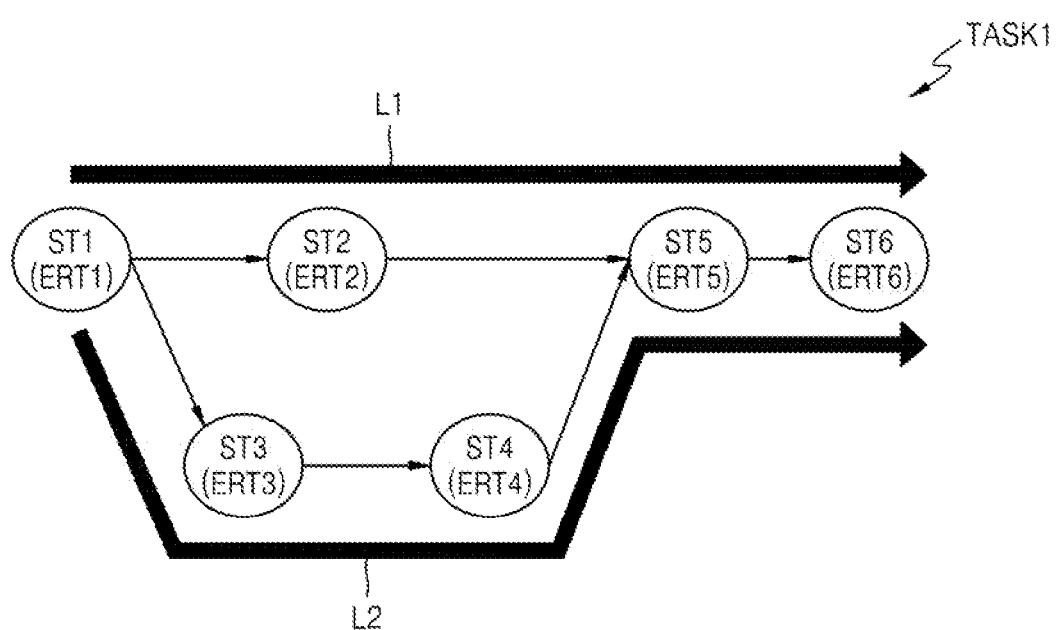
FIG. 5A is a diagram showing paths of a workflow according to an example embodiment.

FIG. 5A is a diagram showing paths of a workflow according to an example embodiment. FIG. 5B is a diagram showing deadline times of sub-tasks calculated based on a first path of a workflow according to an example embodiment. FIG. 5C is a diagram showing deadline times of sub-tasks calculated based on a second path of a workflow according to an example embodiment. Hereinafter, with reference to FIGS. 5A to 5C, a detailed operation of the task analyzing module 110 for calculating respective deadline times of a plurality of sub-tasks and a plurality of layer tasks will be described. Also, for convenience of explanation, it is assumed that the resource 300 includes only the first resource 310_1 and the second resource 310_2.

The task analyzing module 110 provides a function of calculating a deadline time DT, which is used to identify whether each scheduled task is delayed. A method of calculating a deadline time of a sub-task and a method of calculating a deadline time of a layer task may be different from each other. Hereinafter, the method of calculating a deadline time of a sub-task will be described first.

The task analyzing module 110 may calculate a deadline time of each sub-task based on an expected runtime, which is expressed as the sum of a calculation time of a corresponding sub-task and a transfer time of the corresponding sub-task. Here, the calculation time of a sub-task refers to a time elapsed for a resource to perform a calculation regarding the sub-task, and the transfer time of a sub-task refers to a time elapsed to transmit data related to the sub-task to a resource.

First, the task analyzing module 110 may predict a calculation time of a sub-task based on a calculation time of the same or similar task performed in the past. For example, the task analyzing module 110 may predict the calculation time of the first sub-task ST1 based on a previous calculation time of a task that is the same as or similar to the first sub-task ST1.

Because the calculation time of a sub-task may vary depending on a resource performing the sub-task, the calculation time of the sub-task may vary from the first resource 310_1 to the second resource 310_2. Accordingly, the task analyzing module 110 may calculate calculation times of one sub-task for respective resources. For example, the task analyzing module 110 may predict a calculation time for the first resource 310_1 and a calculation time for the second resource 310_2 regarding the first sub-task ST1.

In another example embodiment, the task analyzing module 110 may calculate one calculation time for one sub-task. In an example embodiment, the task analyzing module 110 may calculate one calculation time for one sub-task by using calculation times of cases where the first resource 310_1 and the second resource 310_2 performed the same or similar task in the past. For example, the task analyzing module 110 may calculate an average of a previous calculation time for the first resource 310_1 and a previous calculation time for the second resource 310_2 as the calculation time of the first sub-task ST1.

However, the method of calculating a calculation time of a sub-task using previous calculation times of the first resource 310_1 and the second resource 310_2 is not limited to the above-described example, and weights may be applied to respective resources according to example embodiments. For example, the task analyzing module 110 may calculate a calculation time of the first sub-task ST1 consisting of a previous calculation time of the first resource 310_1 and a previous calculation time of the second resource 310_2 in a ratio of 2:1.

Next, the task analyzing module 110 may calculate a transfer time of each sub-task. Because the resources 310_1, 310_2, . . . 310_n may have different bandwidths according to resource types and resource specifications, a transfer time of a sub-task may vary from the first resource 310_1 to the second resource 310_2. Therefore, the transfer time of a sub-task may be calculated using Equation 1 below.

< Equation 1 >

$$T_{transfer(STi,sj)} = \sum_{n \in K} \left( \frac{I_{STi}^n}{B_{sj}} \right)$$

Here, $T_{transfer(STi,sj)}$ denotes a transfer time of a sub-task STi to a resource $S_j$, and $I_{STi}^n$ denotes a length of n-th data related to the sub-task STi. The processor 100 and the resource 300 may perform data exchanges for a plurality of number of times during execution of the sub-task STi, and thus, data related to the sub-task STi may include a set like $\{I_{STi}^1, I_{STi}^2, \ldots, I_{STi}^n, \ldots, I_{STi}^K\}$. $B_{sj}$ denotes a bandwidth of the resource $S_j$. Regarding $S_i$, S denotes the type of a resource (e.g., GPU, FPGA, etc.), and j denotes a number of each resource belonging to a corresponding resource type. For example, the first resource 310_1, which is a first GPU, may be expressed as $GPU_1$, whereas the second resource 310_2, which is a first FPGA, may be expressed as $FPGA_1$.

The task analyzing module 110 may calculate an expected runtime of a particular resource for a sub-task by using a calculation time of the sub-task and a transfer time of the sub-task to the particular resource. For example, Equation 2 below may be used to calculate an expected runtime.

< Equation 2 >

$$T_{sj}^{ee}(ST_i) = \sum_{n \in K} \left( \frac{I_{STi}^n}{B_{sj}} \right) + T_{e,sj}^{STi}$$

Here, $T_{sj}^{ee}(ST_i)$ denotes an expected runtime of the resource $S_j$ for the sub-task $ST_i$, and $T_{e,sj}^{STi}$ denotes a calculation time of the resource $S_j$ for the sub-task $ST_i$. Meanwhile, according to example embodiments, $T_{e,sj}^{STi}$ may be replaced with an average of calculation times of resources for the sub-task $ST_i$.

In an example embodiment, the task analyzing module 110 may determine the calculated expected runtime as the deadline time of the sub-task $ST_i$. However, example embodiments are not limited thereto, and the deadline time of a sub-task may be a value similar to an expected runtime. In another example embodiment, the task analyzing module 110 may calculate a deadline time of the sub-task by additionally considering an expected runtime of the first task TASK1 as well as the expected runtime of the sub-task.

The task analyzing module 110 may identify all paths in the workflow of the first task TASK1, and determine the longest expected runtime from among identified paths as the expected runtime of the first task TASK1. The expected runtime of the first task TASK1 may be the same as the total deadline time of the first task TASK1. Here, a path refers to a route starting from a first sub-task of a workflow to the last sub-task, and the expected runtime of each path may be calculated as the sum of expected runtimes of sub-tasks constituting the path. The task analyzing module 110 may calculate ratios of the expected runtimes of a plurality of sub-tasks with respect to the expected runtime of the first task TASK1 (or the total deadline time of the first task TASK1), and calculate deadline times respectively corresponding to the calculated ratios.

In an example embodiment, with respect to the method of determining the expected runtime of the first task TASK1, the task analyzing module 110 may identify a critical path, which is the path with the longest expected runtime from among all paths, and determine the expected runtime of the critical path as the expected runtime of the first task TASK1 (i.e., the total deadline time of the first task TASK1).

For example, referring to FIG. 5A, the first task TASK1 may include a first path L1 consisting of <first sub-task ST1-second sub-task ST2-fifth sub-task ST5-sixth sub-task ST6> and a second path L2 consisting of <first sub-task ST1-third sub-task ST3-fourth sub-task ST4-fifth sub-task ST5-sixth sub-task ST6>. The second sub-task ST2 may be performed in parallel with the third sub-task ST3 and the fourth sub-task ST4.

An expected runtime of the first path L1 is the same as the sum of an expected runtime ERT1 of the first sub-task ST1, an expected runtime ERT2 of the second sub-task ST2, an expected runtime ERT5 of the fifth sub-task ST5, and an expected runtime ERT6 of the sixth sub-task ST6. An expected runtime of the second path L2 is the same as the sum of the expected runtime ERT1 of the first sub-task ST1, an expected runtime ERT3 of the third sub-task ST3, an expected runtime ERT4 of the fourth sub-task ST4, the expected runtime ERT5 of the fifth sub-task ST5, and the expected runtime ERT6 of the sixth sub-task ST6. When the expected runtime ERT2 of the second sub-task ST2 is less than the sum of the expected runtime ERT3 of the third sub-task ST3 and the expected runtime ERT4 of the fourth sub-task ST4, the second path L2 is the critical path. Otherwise, the first path L1 is the critical path.

The task analyzing module 110 may calculate deadline times corresponding to ratios of expected runtimes of sub-tasks constituting the critical path with respect to the expected runtime of the critical path. Equation 3 below may be used to calculate a deadline time of a sub-task.

< Equation 3 >

$$T_{sj}^{ae}(STi) = D \cdot \frac{T_{sj}^{ee}(STi)}{\sum_{ST_i \in L_c} T_{sj}^{ee}(STi)}$$

Here, $T_{sj}^{ae}(STi)$ denotes a deadline time of a resource $S_j$ for the sub-task STi, D is a constant number indicating the expected runtime of the critical path, $T_{sj}^{ee}(STi)$ denotes an expected runtime of the resource $S_j$ for the sub-task STi, and Lc denotes a c-th path. D may be set by a user or a manufacturer, and may be changed.

Referring to FIG. 5B, when the critical path is the first path L1, deadline times DT1 to DT6 of the first resource 310_1 for a plurality of sub-tasks ST1 to ST6 may be identified. When the critical path is the first path L1, the expected runtime (i.e., an total deadline time D) of the critical path may be expressed as the sum of the expected runtime ERT1 of the first sub-task ST1, the expected runtime ERT2 of the second sub-task ST2, the expected runtime ERT5 of the fifth sub-task ST5, and the expected runtime ERT6 of the sixth sub-task ST6. Also, a deadline time DT1 of the first sub-task ST1, a deadline time DT2 of the second sub-task ST2, a deadline time DT5 of the fifth sub-task ST5, and a deadline time DT6 of the sixth sub-task ST6 may be calculated according to Equation 3 described above.

The deadline time DT3 and the deadline time DT4 of the third sub-task ST3 and the fourth sub-task ST4 constituting the second path L2 may be set, such that the sum thereof is the same as the deadline time DT2 of the second sub-task ST2, and the deadline time DT3 and the deadline time DT4 correspond to a ratio between the expected runtime ERT3 and the expected runtime ERT4.

Referring to FIG. 5C, when the critical path is the second path L2, deadline times DT1 to DT6 of the first resource 310_1 for a plurality of sub-tasks ST1 to ST6 may be identified. When the critical path is the second path L2, the expected runtime (i.e., an total deadline time D) of the critical path may be expressed as the sum of the expected runtime ERT1 of the first sub-task ST1, the expected runtime ERT3 of the third sub-task ST3, the expected runtime ERT4 of the fourth sub-task ST4, the expected runtime ERT5 of the fifth sub-task ST5, and the expected runtime ERT6 of the sixth sub-task ST6. The deadline time DT1 of the first sub-task ST1, a deadline time DT3 of the third sub-task ST3, a deadline time DT4 of the fourth sub-task ST4, the deadline time DT5 of the fifth sub-task ST5, and the deadline time DT6 of the sixth sub-task ST6 may be calculated according to Equation 3 described above.

The deadline time DT2 of the second sub-task ST2 constituting the first path L1 may be set to be the same as the sum of the deadline time DT3 and the deadline time DT4 of the third sub-task ST3 and the fourth sub-task ST4.

A deadline time of a layer task may be calculated in a different way from the above-described example. Hereinafter, a method of calculating a deadline time of a layer task will be described.

The task analyzing module 110 may calculate an expected runtime of a particular resource for a layer task. In an example embodiment, the task analyzing module 110 may calculate an expected runtime of a layer task based on runtime of calculation between layers of a neural network corresponding to the layer task and transfer time for data related to the layers of the neural network corresponding to the layer task. For example, Equation 4 below may be used to calculate an expected runtime of a layer task.

< Equation 4 >

$$T_{sj}^{ee}(LTk) = P_{sj} \times gk + Q_{sj} \times \frac{I_k}{B_{sj}} + R_{sj}$$

Here, $T_{sj}^{ee}(LT_k)$ denotes an expected runtime of the resource $S_j$ for a layer task $LT_k$, gk denotes the amount of calculations between layers of a neural network corresponding to the layer task $LT_k$, lk denotes an amount of data related to the layers of the neural network corresponding to the layer task $LT_k$, and $B_{sj}$ denotes a bandwidth of the resource $S_j$. $P_{sj}$, $Q_{sj}$, and $R_{sj}$ are hyperparameters dependent on the resource $S_j$ and may be derived experimentally.

The task analyzing module 110 may calculate deadline times of a plurality of sub-tasks and a plurality of layer tasks according to the above-described embodiment. The task analyzing module 110 may provide task information Info_TASK including the calculated deadline times to the scheduling module 120.

Figure 6:
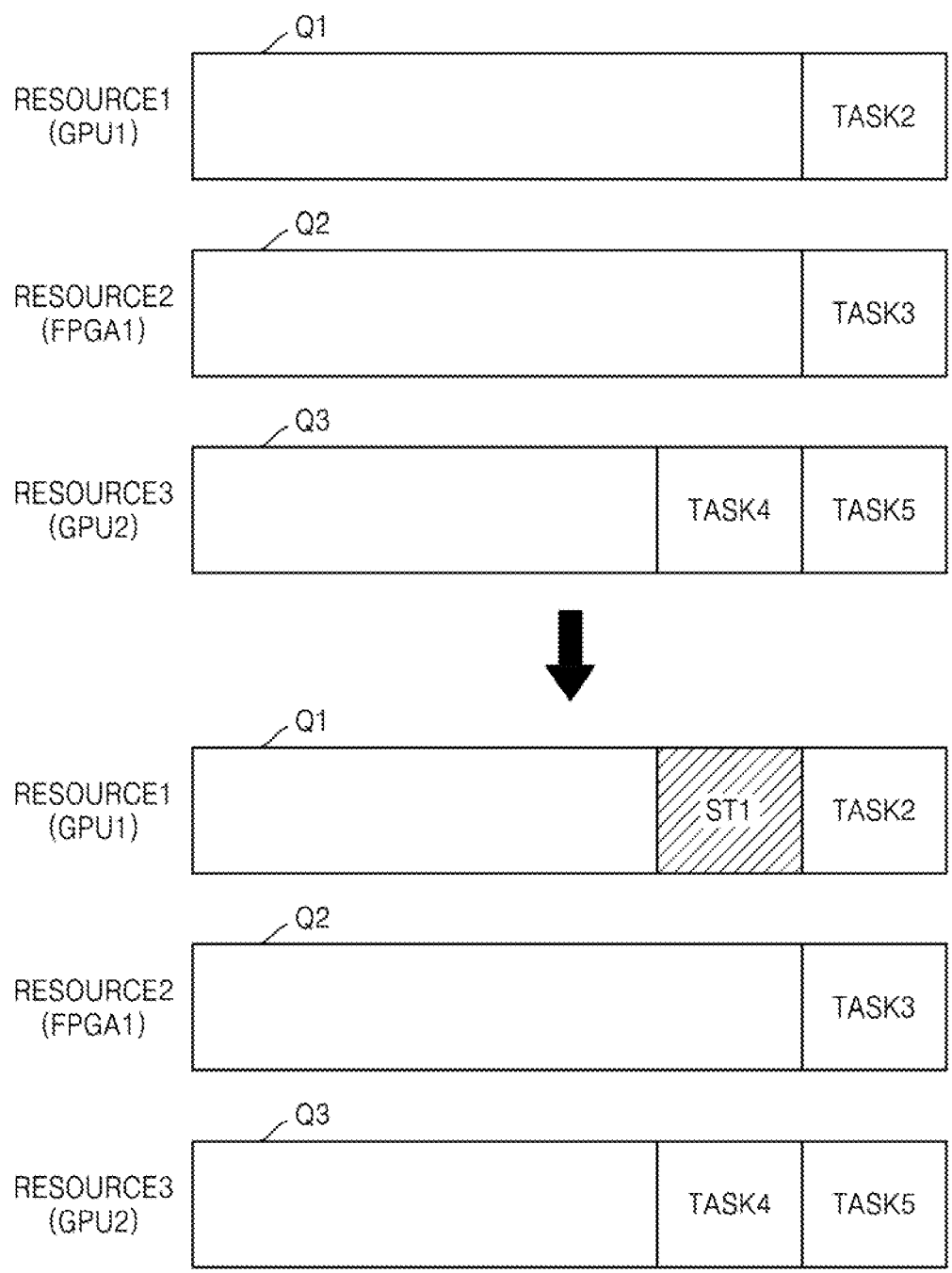
FIG. 6 is a diagram for describing a scheduling operation according to an example embodiment.

FIG. 6 is a diagram for describing a scheduling operation according to an example embodiment. In detail, FIG. 6 is a diagram for describing a scheduling operation of the scheduling module 120 of FIG. 2.

The scheduling module 120 provides a function of scheduling sub-tasks to the resource 300. In detail, the scheduling module 120 may receive the task information Info_TASK from the task analyzing module 110, and sequentially schedule sub-tasks to the resources 310_1, 310_2, . . . 310_n according to an order of executing tasks identified based on the task information Info_TASK.

The scheduling operation of the scheduling module 120 may include an operation of allocating sub-tasks to queues of the resources 310_1, 310_2, . . . 310_n. The scheduling module 120 may be implemented to allocate a next sub-task to one of the queues of the resources 310_1, 310_2, . . . 310_n after one sub-task is completed, instead of allocating all sub-tasks to the queues of the resources 310_1, 310_2, . . . 310_n at a certain time point.

Hereinafter, for convenience of explanation, it is assumed that the resource 300 of FIG. 1 includes a first resource RESOURCE1, a second resource RESOURCE2, and a third resource RESOURCE3 only, the first resource RESOURCE1 and the third resource RESOURCE3 are GPUs (i.e., GPU1 and GPU2), and the second resource RESOURCE2 is an FPGA (i.e., FPGA1).

Referring to FIG. 6, the scheduling module 120 may allocate a sub-task (e.g., the first sub-task ST1) to one of resources of the resource 300, which is a GPU. In detail, the scheduling module 120 may allocate to a resource expected to process the first sub-task ST1 fast from between the first resource RESOURCE1 and the third resource RESOURCE3, which are GPUs.

To this end, the scheduling module 120 may identify a queue Q1 of the first resource RESOURCE1 and a queue Q3 of the third resource RESOURCE3. Tasks to be processed in the future are arranged in queues Q1, Q2, and Q3 of resources 300, and the queues Q1, Q2, and Q3 may be implemented as first-in, first-out (FIFO), for example. Because each resource is capable of processing a plurality of tasks, tasks arranged in queues Q1 and Q2 are tasks different from the first task TASK1.

The scheduling module 120 may calculate expected runtimes of tasks arranged in queues Q1 and Q3 of the first resource RESOURCE1 and the third resource RESOURCE3 and allocate the first sub-task ST1 to a resource with a smaller expected runtime. In an example embodiment, the scheduling module 120 may calculate expected runtimes of tasks arranged in each resource using Equation 5 below and allocate a sub-task to a resource with the smallest expected runtime.

$$T_q^{sj} = \Sigma_{k=1}^{j} T_{sj}^{ee}(W_k^{sj})$$ <Equation 5>

Here, $T_q^{sj}$ denotes a total expected runtime of tasks arranged in a queue of the resource $S_j$, $T_{sj}^{ee}(W_k^{sj})$ denotes an expected runtime of a task $W_k^{sj}$ arranged in the queue of the resource Sj, and the tasks arranged in the queue of the resource Sj may include sets like $\{W_1^{sj}, W_2^{sj}, \ldots, W_j^{sj}\}$. $T_{sj}^{ee}(W_k^{sj})$ may be calculated based on a previous history of executing a task that is the same as or similar to the task $W_k^{sj}$.

Referring to FIG. 6, a second task TASK2 is arranged in the queue Q1 of the first resource RESOURCE1, and a fourth task TASK4 and a fifth task TASK5 are arranged in the queue Q3 of the third resource RESOURCE3. When an expected runtime of the second resource RESOURCE2 is longer than the expected runtime of the third resource RESOURCE3, the scheduling module 120 may allocate the first sub-task ST1 to the first resource RESOURCE1.

Figure 7:
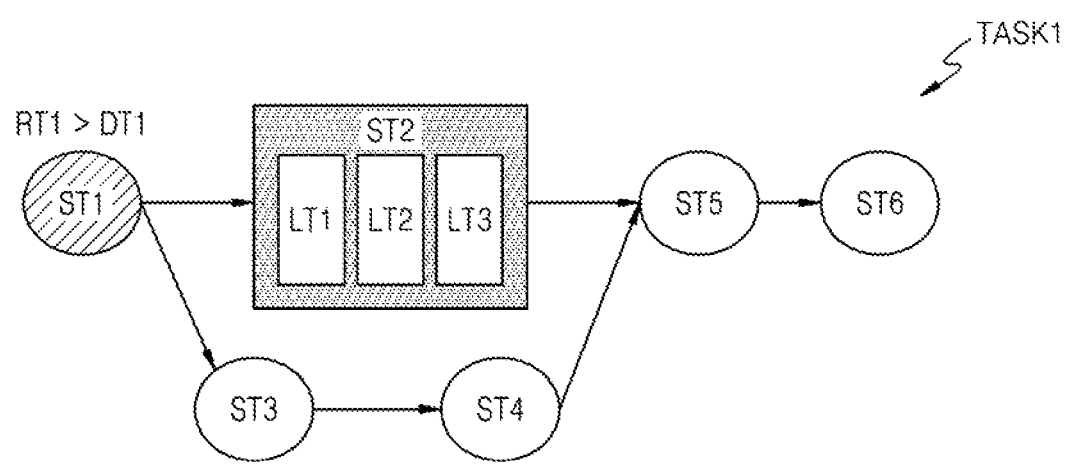
FIG. 7 is a diagram for describing an operation of a scheduling module for identifying a runtime for each sub-task according to an example embodiment.

FIG. 7 is a diagram for describing an operation of a scheduling module for identifying a runtime for each sub-task according to an example embodiment.

Referring to FIG. 7, the scheduling module 120 may allocate the first sub-task ST1 to a resource that is a GPU from among the resources 310_1, 310_2, . . . 310_n, and may identify a runtime RT1 of the first sub-task ST1. Here, the runtime refers to a time from a starting time of a sub-task to a completion time or an error occurrence time of the sub-task.

When the scheduling module 120 confirms that the runtime RT1 of the first sub-task ST1 is less than or equal to the deadline time DT1, the second sub-task ST2 and the third sub-task ST3 may be scheduled to the resources 310_1, 310_2, . . . 310_n. Next, the scheduling module 120 may identify runtimes RT2 and RT3 of the second sub-task ST2 and the third sub-task ST3, respectively.

As shown in FIG. 7, the runtime RT1 of the first sub-task ST1 may exceed the deadline time DT1. Therefore, the scheduling module 120 may determine that a time delay has occurred while the first sub-task ST1 is being performed, and allocate at least one of subsequent sub-tasks and layer tasks to a resource that is an FPGA.

For example, referring to FIG. 7, the scheduling module 120 may identify the second sub-task ST2 and the layer tasks LT1, LT2, and LT3 as tasks using a CNN model from among sub-tasks ST2, ST3, ST4, ST5, and ST6 and layer tasks LT1, LT2, and LT3 subsequent to the first sub-task ST1. Next, the scheduling module 120 may allocate the second sub-task ST2 to an FPGA or allocate at least one of the layer tasks LT1, LT2, and LT3 to an FPGA. A particular method, performed by the scheduling module 120, of allocating a subsequent task to the resource 300 will be described below with reference to FIGS. 8A and 8B.

Figure 8A:
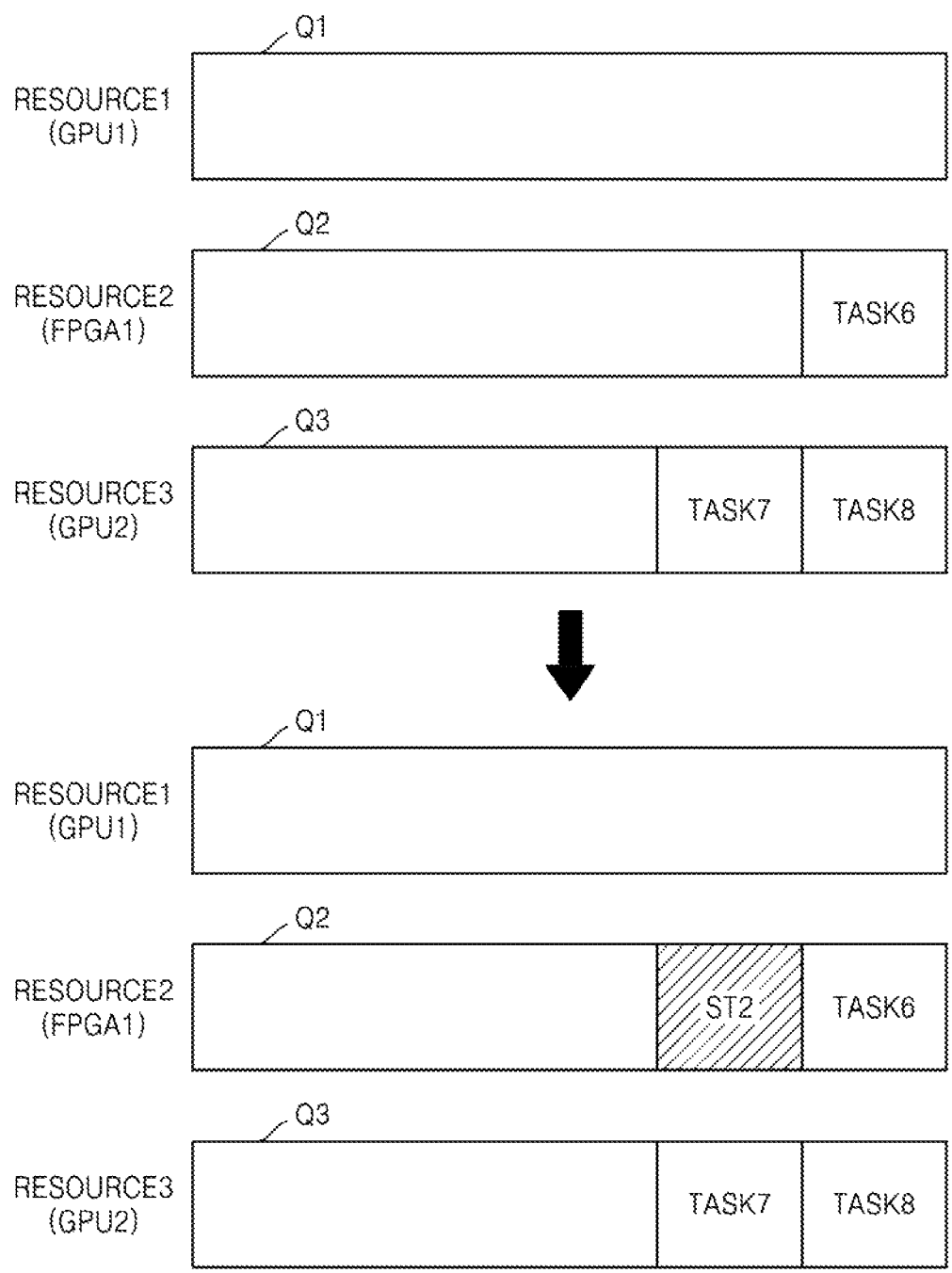
FIG. 8A is a diagram for describing an operation for allocating a subsequent sub-task according to an example embodiment.
Figure 8B:
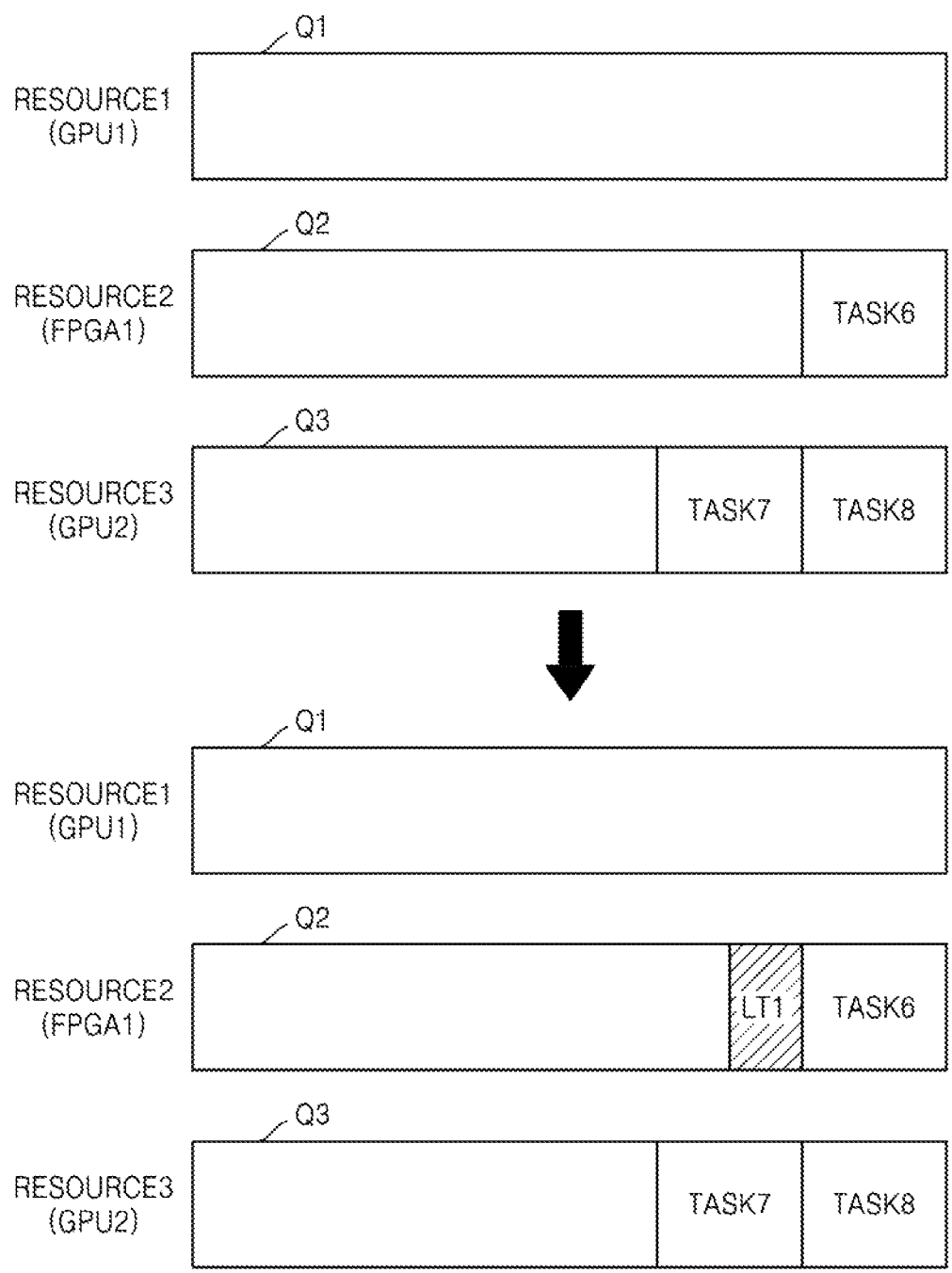
FIG. 8B is a diagram for describing an operation for allocating a subsequent layer task according to an example embodiment.

FIG. 8A is a diagram for describing an operation for allocating a subsequent sub-task according to an example embodiment. FIG. 8B is a diagram for describing an operation for allocating a subsequent layer task according to an example embodiment.

As described above with reference to FIG. 7, when a delay occurs in the first sub-task ST1, the scheduling module 120 may allocate at least one of subsequent sub-tasks and layer tasks to a resource that is an FPGA. Hereinafter, for convenience of explanation, it is assumed that the resource 300 of FIG. 1 includes a first resource RESOURCE1, a second resource RESOURCE2, and a third resource RESOURCE3 only, the first resource RESOURCE1 and the third resource RESOURCE3 are GPUs, and the second resource RESOURCE2 is an FPGA.

The scheduling module 120 may identify a sub-task using a CNN model from among subsequent sub-tasks. For example, referring to FIG. 7, the scheduling module 120 may identify the second sub-task ST2 as a task using a CNN model from among the sub-tasks ST2, ST3, ST4, ST5, and ST6 subsequent to the first sub-task ST1.

Referring to FIG. 8A, the scheduling module 120 may allocate the second sub-task ST2 to the second resource RESOURCE2 that is an FPGA. When there are multiple FPGAs, the scheduling module 120 may allocate the second sub-task ST2 to an FPGA that is determined to be able to process the second sub-task ST2 fastest from among the FPGAs. For example, the scheduling module 120 may calculate expected runtimes of other tasks arranged in queues of a plurality of FPGAs, and allocate the second sub-task ST2 to an FPGA corresponding to the smallest expected runtime.

In another example embodiment, the scheduling module 120 may identify a layer task using a CNN model from among subsequent tasks. For example, referring to FIG. 8B, the scheduling module 120 may identify layer tasks LT1, LT2, and LT3 using a CNN model from among subsequent tasks of the first sub-task ST1.

Referring to FIG. 8B, the scheduling module 120 may allocate at least one of the identified layer tasks LT1, LT2, and LT3 (e.g., the first layer task LT1) to the second resource RESOURCE2, which is an FPGA. When there are FPGAs, the scheduling module 120 may allocate the first layer task LT1 to an FPGA that is determined to be able to process the first layer task LT1 fastest from among the FPGAs. For example, the scheduling module 120 may calculate expected runtimes of other tasks arranged in queues of a plurality of FPGAs, and allocate the first layer task LT1 to an FPGA corresponding to the smallest expected runtime.

When a large number of other tasks are already arranged in the queue of an FPGA, a time for the FPGA to process a task using a CNN model may be longer than a time for a GPU to process the task using the CNN model. Therefore, the scheduling module 120 may be implemented to, when a delay occurs, allocate one of subsequent tasks to a resource that is expected to process a corresponding task fastest from among all the resources including GPUs and FPGAs (i.e., the first resource RESOURCE1, the second resource RESOURCE2, and the third resource RESOURCE3). In this case, the scheduling module 120 may calculate an expected runtime of a subsequent task and expected runtimes of other tasks waiting for each resource, and select one resource based on the calculated expected runtimes.

In an example embodiment, after a subsequent sub-task or layer task is scheduled to the resource 300, the scheduling module 120 may identify whether a runtime of the corresponding task exceeds a deadline time. When the runtime of a scheduled task exceeds the deadline time, another subsequent task may be allocated to an FPGA to further reduce the total runtime.

Figure 9:
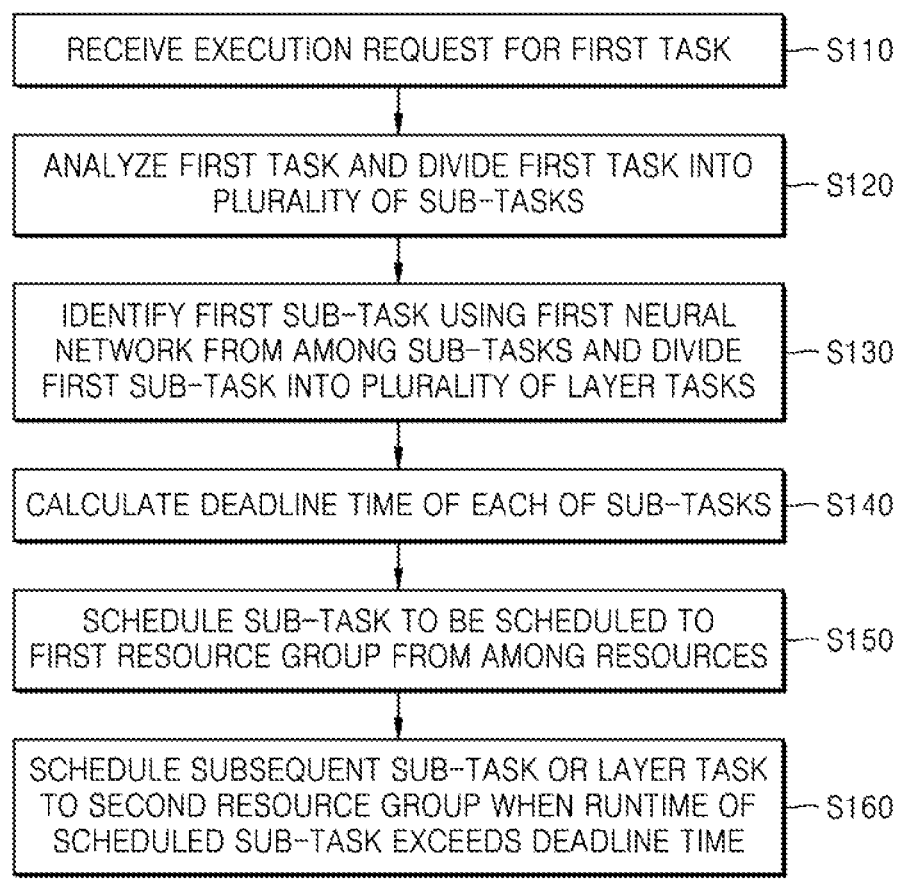
FIG. 9 is a flowchart of a task execution method according to an example embodiment.

FIG. 9 is a flowchart of a task execution method according to an example embodiment. In detail, FIG. 9 is a flowchart of a method, performed by the processor 100 of FIG. 1, of executing a task.

Referring to FIG. 9, the processor 100 may receive a request to execute a first task (operation S110).

The processor 100 may analyze the first task, and divide the first task into a plurality of sub-tasks (operation S120). In an example embodiment, the processor 100 may divide a first task into a plurality of sub-tasks based on various criteria like types and sizes of input and output data, types of calculations, and types of neural networks used for processing tasks, etc. The processor 100 may generate a workflow to which an order of executing the sub-tasks is reflected. For example, the workflow may be implemented in the form of a DAG.

The processor 100 may identify a first sub-task using a first neural network from among the sub-tasks, and divide the first sub-task into a plurality of layer tasks (operation S130). Here, the first neural network refers to, for example, a CNN model. However, example embodiments are not limited thereto, and the first neural network may include neural networks of other types, e.g., an RNN model. The processor 100 may divide a sub-task using the first neural network into layer tasks, which are tasks corresponding to calculations between layers constituting the first neural network.

The processor 100 may calculate a deadline time of each of the sub-tasks (operation S140). In detail, the processor 100 may first calculate expected runtimes of the sub-tasks. The expected runtimes of the sub-tasks may be calculated based on a previous history of executing sub-tasks that are the same as or similar to the sub-tasks. Next, the processor 100 may calculate a transfer time of each of the sub-tasks to a resource. Next, the processor 100 may calculate an expected runtime of each of the sub-tasks by using the expected runtime and the transfer time of each of the sub-tasks.

Next, the processor 100 may identify all paths in the workflow of the first task and determine a path corresponding to the longest expected runtime from among the identified paths as the expected runtime of the first task. Here, a path refers to a route starting from a first sub-task of a workflow to the last sub-task, and the expected runtime of each path may be calculated as the sum of expected runtimes of sub-tasks constituting the path. The task analyzing module 110 may calculate ratios of the expected runtimes of the sub-tasks with respect to the expected runtime of the first task and calculate deadline times respectively corresponding to the calculated ratios.

In an example embodiment, the processor 100 may also calculate deadline times of layer tasks. In detail, the processor 100 may calculate a deadline time of a layer task based on runtimes of calculations between layers of a neural network corresponding to the layer task and transfer times for data related to the layers of the neural network corresponding to each the layer task.

Next, the processor 100 may schedule a sub-task to a first resource group from among the resources 310_1, 310_2, . . . . 310_n (operation S150). In detail, the processor 100 may divide the resources 310_1, 310_2, . . . 310_n into a first resource group and a second resource group according to types of resources, and allocate a sub-task to a resource that belongs to the first resource group and is expected to execute the sub-task fastest, from among resources belonging to the first resource group. For example, the first resource group may include resources that are GPUs, and the second resource group may include resources that are FPGAs.

Next, when the runtime of a scheduled sub-task exceeds the deadline time, the processor 100 may schedule a subsequent sub-task or layer task to the second resource group (operation S160). In detail, when the execution of a sub-task allocated to a GPU is delayed, the processor 100 may allocate at least one of sub-tasks and layer tasks subsequent to the sub-task to an FPGA. Here, the task allocated to an FPGA is a task that may be processed faster by an FPGA than by a GPU, e.g., a sub-task or a layer task using a CNN model. Meanwhile, when there are resources (i.e., FPGAs) belonging to the second resource group, the processor 100 may allocate a subsequent task to an FPGA expected to quickly execute other tasks waiting from among the FPGAs.

As described above, according to the task execution method according to the present example embodiment, the processor 100 divides a requested task into a plurality of sub-tasks and allocates the divided sub-tasks to resources of a first type. Here, when a delay occurs, the electronic device 1000 identifies a subsequent sub-task or a subsequent layer task that may be processed faster by a resource of a second type, and allocates the identified task to a resource of the second type, thereby reducing the total execution time.

However, example embodiments are not limited to the above-described examples. According to another example embodiment, the processor 100 may be implemented to divide a requested task into several sub-tasks and layer tasks, and allocate the divided sub-tasks and layer tasks to corresponding resources. Detailed descriptions thereof will be given below in connection with FIG. 10.

Figure 10:
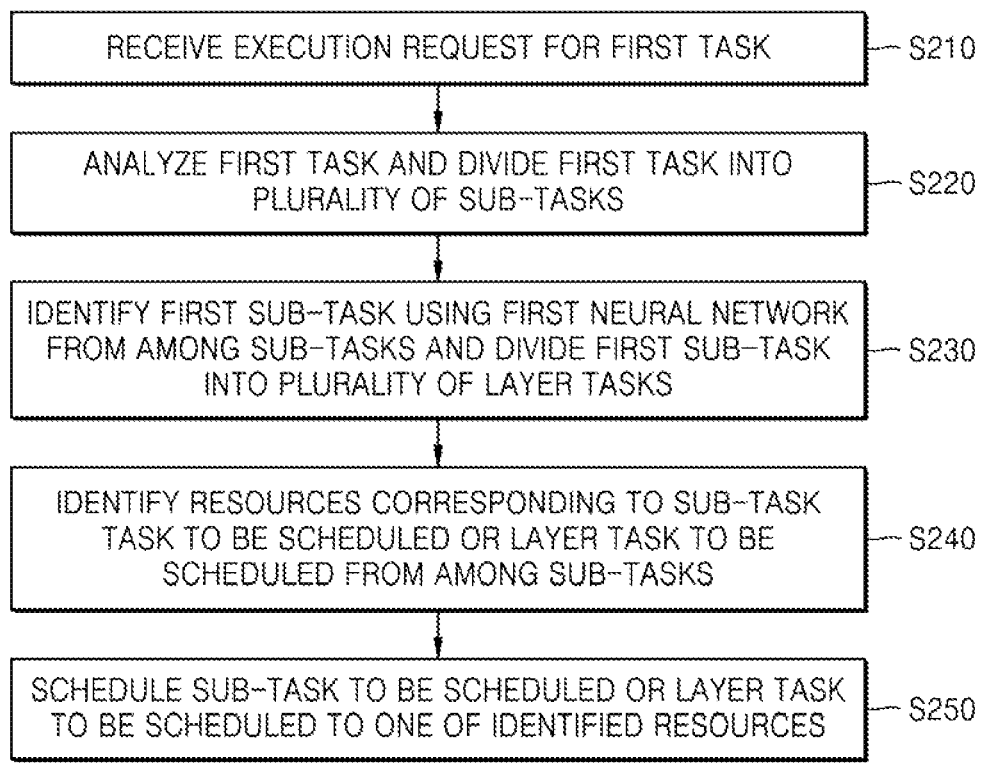
FIG. 10 is a flowchart of a task execution method according to another example embodiment.

FIG. 10 is a flowchart of a task execution method according to another example embodiment. In detail, FIG. 10 is a flowchart of a method, performed by the processor 100 of FIG. 1, of executing a task according to another example embodiment. Descriptions of the task execution method identical to those already given above with reference to FIG. 9 will be omitted below.

Referring to FIG. 10, the processor 100 may receive a request to execute a first task (operation S210).

The processor 100 may analyze the first task and divide it into a plurality of sub-tasks (operation S220).

The processor 100 may identify a first sub-task using a first neural network from among the sub-tasks and divide the first sub-task into a plurality of layer tasks (operation S230).

The processor 100 may identify resources corresponding to a sub-task or a layer task to be scheduled from among a plurality of resources (operation S240). In detail, a sub-task or a layer task may correspond to different resources depending on whether the sub-task or the layer task uses a neural network of a particular type. For example, a sub-task or a layer task capable of using a CNN model may correspond to an FPGA, whereas a sub-task that does not use a CNN model may correspond to a GPU.

The processor 100 may schedule the sub-task or the layer task to be scheduled to one of identified resources (operation S250). For example, when the task to be scheduled is a sub-task or a layer task capable of using a CNN model, the processor 100 may allocate the task to be scheduled to one of FPGAs. Also, when the task to be scheduled is a sub-task that does not use the CNN model, the processor 100 may allocate the task to be scheduled to one of GPUs.

In this way, according to the task execution method according to the present embodiment, a target task to be scheduled may be scheduled to a resource of a type capable of processing the target task faster based on whether the target task uses a neural network of a particular type.

Figure 11:
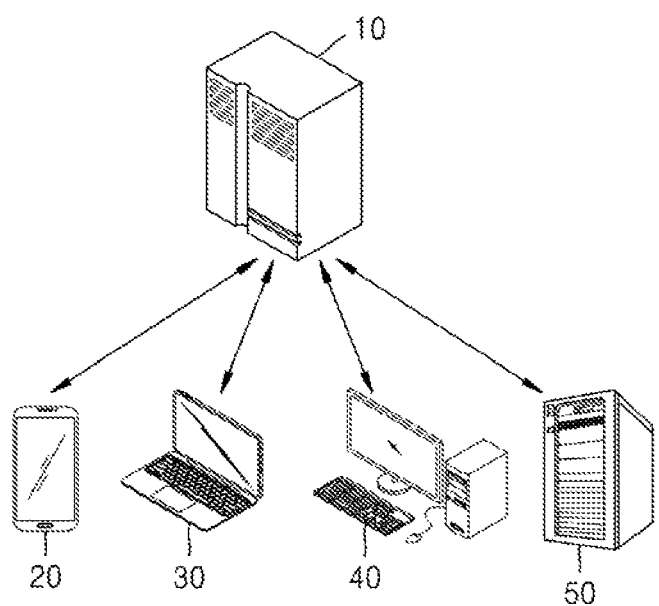
FIG. 11 is a diagram showing an edge computing system according to an example embodiment.

FIG. 11 is a diagram showing an edge computing system according to an example embodiment.

An edge computing system is a system that has a structure that differs from a cloud computing system. The edge computing system first processes data through nearby electronic devices (e.g., a smartphone, a wearable device, a mobile device, a smart home sensor, etc.) and then perform additional tasks by using processed data through a separate device (e.g., a cloud data center) at a remote location.

Referring to FIG. 11, the edge computing system may process data through one of electronic devices 20, 30, 40, and 50 located nearby, and the electronic devices 20, 30, 40, and 50 may perform secondary tasks through communication with the cloud data center 10 at a remote location.

According to an example embodiment, the electronic devices 20, 30, 40, and 50 may correspond to the electronic device 1000 described above with reference to FIGS. 1 to 10. Also, according to the present example embodiment, when the electronic device 1000 and the resource 300 are implemented as separate components, each of the electronic devices 20, 30, 40, and 50 may correspond to the electronic device 1000 or the resource 300.

By way of summation and review, in the case of an edge computing system, the edge computing system includes heterogeneous resources, but the number of resources may be limited, and thus, there is an increasing demand for a scheduling method for efficiently using such resources.

As described above, embodiments relate to a task execution method for dividing a task into a plurality of sub-tasks, and properly scheduling the sub-tasks to a plurality of resources, and an electronic device using the task execution method.

Embodiments may provide a task execution method for dividing a task into a plurality of sub-tasks, scheduling the sub-tasks to first resources, and, when a delay occurs while executing tasks using the first resources, performing subsequent processes by using second resources.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A task execution method using resources, the task execution method comprising:
receiving an execution request for a first task;
analyzing the first task and dividing the first task into a plurality of sub-tasks;
identifying a sub-task using a first neural network from among the plurality of sub-tasks and dividing the identified sub-task into a plurality of layer tasks corresponding to calculations between layers constituting the first neural network;
calculating a deadline time of each of the plurality of sub-tasks;
scheduling a first sub-task to be scheduled to a first resource group from among the resources;
executing the first sub-task;
measuring a runtime of the executing of the first sub-task;
determining whether the runtime of the first sub-task exceeds a deadline time of the first sub-task, and
scheduling, in response to determining that the runtime of the first sub-task exceeds the deadline time of the first sub-task, the sub-task using the first neural network of the plurality of layer tasks of the sub-task using the first neural network subsequent to the first sub-task to a second resource group to reduce a total runtime of the first task, wherein the sub-task using the first neural network is a task to be processed faster by the second resource group than the first resource group.

2. The task execution method as claimed in claim 1, wherein:
the first resource group includes resources that are graphics processing units, and
the second resource group includes resources that are field-programmable gate arrays.

3. The task execution method as claimed in claim 1, wherein the first neural network is a convolutional neural network.

4. The task execution method as claimed in claim 1, wherein the calculating of the deadline time of each of the plurality of sub-tasks includes:
calculating an expected runtime of each of the plurality of sub-tasks;
calculating an expected runtime of the first task; and
calculating the deadline time of each of the plurality of sub-tasks based on the expected runtime of the first task and the expected runtime of each of the plurality of sub-tasks.

5. The task execution method as claimed in claim 4, wherein the calculating of the expected runtime of each of the plurality of sub-tasks includes:
calculating a calculation time for each of the plurality of sub-tasks based on a previous calculation time of a sub-task that is the same as or similar to the corresponding sub-task;
calculating a transfer time of data related to the corresponding sub-task to resources belonging to the first resource group for each of the plurality of sub-tasks; and
calculating the expected runtime of each of the plurality of sub-tasks based on the calculation time and the transfer time for each of the plurality of sub-tasks.

6. The task execution method as claimed in claim 5, wherein, in the analyzing of the first task and dividing of the first task into the plurality of sub-tasks, the first task is converted into a workflow including the plurality of sub-tasks according to an execution order, and
the calculating of the expected runtime of the first task includes:
identifying paths from a first sub-task to a last sub-task from among the plurality of sub-tasks based on the workflow;
calculating an expected runtime of each of the identified paths; and
identifying a critical path having a longest expected runtime from among the identified paths, and determining the expected runtime of the critical path as the expected runtime of the first task.

7. The task execution method as claimed in claim 6, wherein, in the calculating of the expected runtime of each of the identified paths, a sum of expected runtimes of sub-tasks constituting each of the identified paths is calculated as the expected runtime of each of the identified paths.

8. The task execution method as claimed in claim 6, wherein the calculating of the deadline time of each of the plurality of sub-tasks based on the expected runtime of the first task and the expected runtime of each of the plurality of sub-tasks includes:
calculating ratios of expected runtimes of each of the plurality of sub-tasks with respect to the expected runtime of the first task; and
calculating the deadline times of each of the plurality of sub-tasks based on the calculated ratios.

9. The task execution method as claimed in claim 1, wherein:
the scheduling of the first sub-task to be scheduled to the first resource group from among the resources includes:
calculating an expected runtime of other tasks that are queued to queues of resources belonging to the first resource group; and
scheduling the first sub-task to a resource corresponding to smallest expected runtimes for the other tasks from among the resources belonging to the first resource group, and
the scheduling of the plurality of layer tasks of the sub-task subsequent to the first sub-task to the second resource group includes:
calculating the expected runtime of other tasks that are queued to queues of resources belonging to the second resource group; and
scheduling the plurality of layer tasks of the sub-task subsequent to the first sub-task to a resource corresponding to smallest expected runtimes for the other tasks from among resources belonging to the second resource group.

10. A task execution method using resources, the task execution method comprising:
receiving an execution request for a first task;
analyzing the first task and dividing the first task into a plurality of sub-tasks;
identifying a sub-task using a first neural network from among the plurality of sub-tasks, and dividing the identified sub-task into a plurality of layer tasks corresponding to calculations between layers constituting the first neural network;
scheduling a first sub-task to be scheduled to a first resource group from among the resources;
executing the first sub-task;
measuring a runtime of the executing of the first sub-task;
determining whether the runtime of the first sub-task exceeds a deadline time of the first sub-task;
identifying a second resource group from among the resources corresponding to the sub-task to be scheduled from among the resources, and
scheduling, in response to be determining that the runtime of the first sub-exceeds the deadline time of the first sub-task, the sub-task using the first neural network or the plurality of layer tasks of the sub-task using the first neural network subsequent to the first sub-task to the second resource group to reduce a total runtime of the first task, wherein the sub-task using the first neural network is a task to be processed faster by the second resource group than the first resource group.

11. The task execution method as claimed in claim 10, wherein, in the identifying of the second resource group corresponding to the sub-task or the layer task to be scheduled from among the resources,
resources corresponding to sub-tasks that do not use the first neural network are categorized into the first resource group, and
resources corresponding to sub-tasks or layer tasks that use the first neural network are categorized into the second resource group.

12. The task execution method as claimed in claim 11, wherein:
the first resource group includes resources that are graphics processing units, and the second resource group includes resources that are field-programmable gate arrays.

13. The task execution method as claimed in claim 10, wherein the scheduling of the plurality of layer tasks of the sub-task to be scheduled to one of the identified resources includes:
calculating an expected runtime of other tasks that are queued to queues of the identified resources; and
scheduling the sub-task or the layer task to be scheduled to a resource corresponding to smallest expected runtimes for the other tasks from among the identified resources.

14. The task execution method as claimed in claim 10, wherein the first neural network is a convolutional neural network.

15. An electronic device, comprising:
a plurality of resources including at least one field-programmable gate array (FPGA) and at least one graphics processing unit (GPU); and
a processor configured to, when a request to execute a first task is received, analyze the first task, divide the first task into a plurality of sub-tasks, and schedule the plurality of sub-tasks to the at least one GPU,
wherein the processor is further configured to:
identify a sub-task using a first neural network from among the plurality of sub-tasks, and divide the identified sub-task into a plurality of layer tasks corresponding to calculations between layers constituting the first neural network,
execute a first sub-task from among the plurality of sub-tasks,
measure a runtime of the execution of the first sub-task,
determine whether the runtime of the first sub-task from among the plurality of sub-tasks exceeds a deadline time of the first sub-task, and
schedule, in response to determining that the runtime of the first sub-task exceeds the deadline time of the first sub-task, the sub-task using the first neural network or a first layer task subsequent to the first sub-task to the at least one FPGA to reduce a total runtime of the first task, wherein the sub-task using the first neural network is a task to be process faster by the at least one FPGA than the at least one GPU.

16. The electronic device as claimed in claim 15, wherein the first neural network is a convolutional neural network.

17. The electronic device as claimed in claim 15, wherein the processor is further configured to:
calculate runtimes of another previously allocated task for each of the at least one GPU and the at least one FPGA,
calculate an expected runtime of the first layer task for each of the at least one GPU and the at least one FPGA, and
schedule the first layer task to one of the at least one GPU and the at least one FPGA based on the runtime of another previously allocated task of the at least one GPU and the at least one FPGA and the expected runtime of the first layer task for each of the at least one GPU and the at least one FPGA.

18. The electronic device as claimed in claim 17, wherein the processor is further configured to allocate the first layer task to a resource corresponding to a smallest sum of the runtimes of another previously allocated task and the expected runtime of the first layer task, from among the at least one GPU and the at least one FPGA.

19. The electronic device as claimed in claim 15, wherein the processor is further configured to:
calculate an expected runtime of each of the plurality of sub-tasks, and
calculate a deadline time of each of the plurality of sub-tasks based on the expected runtime of each of the plurality of sub-tasks.

20. The electronic device as claimed in claim 19, wherein the processor is further configured to:
calculate a calculation time for each of the plurality of sub-tasks based on a previous calculation time of a sub-task that is the same as or similar to the corresponding sub-task,
calculate a transfer time of data related to the corresponding sub-task to the at least one GPU for each of the plurality of sub-tasks, and
calculate the expected runtime of each of the plurality of sub-tasks based on the calculation time and the transfer time for each of the plurality of sub-tasks.

* * * * *